June 16, 1942.  R. B. AITCHISON ET AL  2,286,192
MINERAL PIERCING AND CUTTING
Filed April 18 1939   2 Sheets-Sheet 2
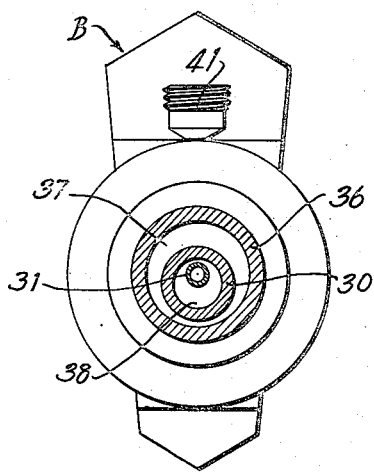
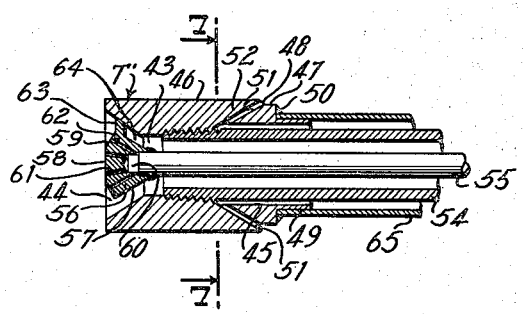
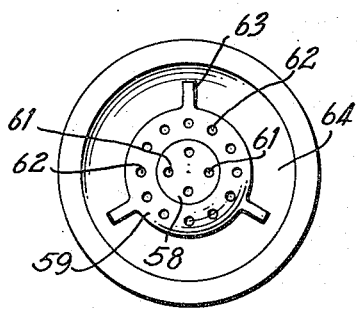
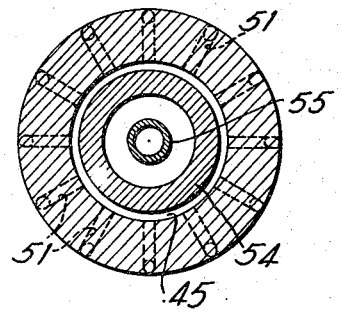
INVENTORS
ROBERT B. AITCHISON
GEORGE H. SMITH
CHARLES W. SWARTOUT
BY *Greenewald*
ATTORNEY Patented June 16, 1942

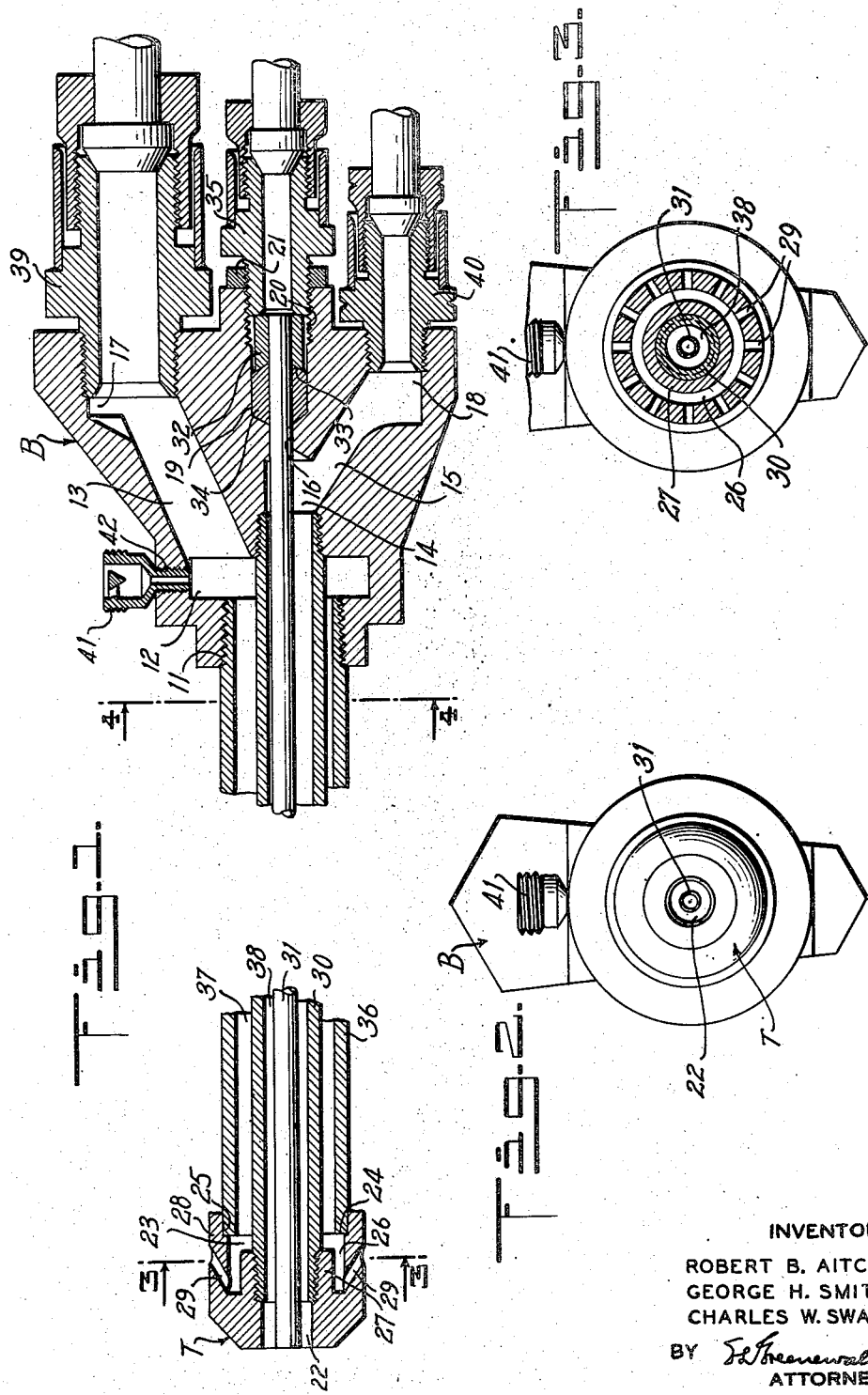

2,286,192

UNITED STATES PATENT OFFICE 2,286,192

MINERAL PIERCING AND CUTTING

Robert B. Aitchison, Grasmere, and George H. Smith and Charles W. Swartout, Kenmore, N. Y., assignors to The Linde Air Products Company, a corporation of Ohio Application April 18, 1939, Serial No. 268,635

29 Claims. (Cl. 262—1)

This invention relates to heating instrumentalities, and more particularly to heating instrumentalities, such as blowpipes, which may be used for performing heating operations within cavities, especially for thermally piercing, cutting, grooving, or otherwise disintegrating compact minerals and mineral-like substances noncombustible in oxygen. The invention also contemplates a novel process for performing such operations.

It has been found that holes for blasting or other purposes may be pierced in minerals and mineral-like substances, such as quartzite, dolomite, and hematite, by applying intense heat to localized areas thereof, and progressively advancing the heat into the substance to heat newly exposed areas as material is progressively removed under the influence of heat. Holes may be pierced to almost unlimited depths by promptly and continuously clearing the removed material from the hole as the heat is advanced. Ordinarily, thermal hole piercing proceeds by either of two processes, a spalling process, or a melting process, depending principally on the kind of substance to be pierced.

Both a spalling process and a melting process are described and claimed in patent application Serial No. 268,634, filed April 18, 1939, in the names of R. B. Aitchison, C. W. Swartout, and V. C. Williams. In a spalling process, heat is directed upon a localized area of a thermally spallable substance such as quartzite, which spalls off in a finely divided unfused condition as a dry sand or as small flakes under the action of the heat alone. These spallings will gradually accumulate in the hole and soon cause a halt in the operation unless steps are taken to clear the hole. When an oxy-fuel gas flame is used for heating, under most circumstances it is possible to pierce holes successfully in spallable material and to use the pressure of the gaseous products of combustion alone to eject spallings from the hole being pierced. In certain cases, however, such as when other means than a gas flame is used for heating, or when the spallings are too large to be lifted by the gaseous products of combustion from holes that are directed downwardly from the horizontal, other provisions must be made for debris ejection. Therefore provision is made for discharging into a hole, adjacent to the bottom and directed rearwardly toward the mouth thereof, a fluid under pressure to eject spallings promptly and continuously as rapidly as they are produced. Water is most advantageous as it dampens the debris and prevents the formation of injurious dust clouds; but air, or a mist of air and water may often be used to good advantage. The most generally used fuel is a hydrocarbon gas such as acetylene which is burned in oxygen within the hole. In some cases, however, intense localized heat may be obtained by burning a powdered exothermically oxidizable metal such as aluminum, iron, or mixtures of the two. Such powdered metals may be conducted to the heating zone suspended in an inert gas or in a fuel gas such as acetylene.

In the melting process, as disclosed and claimed in said patent application Serial No. 268,634, heat is applied to a localized area of a substance, such as hematite, which melts under the influence of heat and produces a more or less viscous slag. In order to increase the fluidity of this slag to facilitate removal from the melting zone, it is essential in most cases to supply a flux to the melting zone. Heat, here also, may be supplied by the combustion, in a combustion-supporting gas, of a fuel, for instance, a fuel such as acetylene burning in a combustion-supporting gas such as oxygen, either with or without the addition of exothermically oxidizable metal powders such as iron, aluminum, or mixtures of the two. Flux is best added to the melting zone by suspending in a gas stream, preferably the fuel stream, either the flux itself or an oxidizable flux-forming material, in comminuted form, and blowing it into the melting zone. Slag ejection may be accomplished by continuously discharging a fluid under pressure adjacent to the bottom of the hole and directed toward the mouth thereof, although in some cases the pressure of the gaseous products of combustion may suffice. Either air, water, or an air-water mixture may likewise be used as an ejection medium in this process, depending upon the type of slag produced. When air is employed as the ejection fluid, the slag may be maintained in a molten condition throughout the length of the hole. Water or an air-water mixture, however, will quench the molten slag after leaving the melting zone, breaking it up and producing solid particles which may be ejected as in a spalling process. Heretofore, no heating instrumentality has been developed which is capable of safely and effectively carrying thermal hole piercing to a practicable depth for blasting or other purposes. The main drawback to the satisfactory functioning of prior heating instrumentalities, particularly blowpipes, has been the problem of promptly and continuously removing debris from the hole being pierced. Another disadvantage of prior instrumentalities resulted from their use of premixed combustible gas mixtures, which have been found unsatisfactory for hole piercing, or for most heating operations within confined spaces, because of the danger of explosive flashbacks occurring within the main body of the blowpipe if the cavity is momentarily clogged up and the gas flow reversed by the pressure which then builds up. Furthermore, other instrumentalities have been incapable of producing a hole of sufficiently greater diameter than the instrumentality itself to provide enough clearance for the free passage of debris from the hole. Other instrumentalities, moreover, have been incapable of conducting therethrough, without clogging or excessive abrasive action, gases in which are suspended particles of comminuted solids.

An object of the present invention, therefore, is to provide a novel heating instrumentality which is adapted for carrying out heating operations in cavities.

Another object of this invention is to provide a novel heating instrumentality which is particularly adapted for safely, rapidly, and efficiently piercing, cutting, grooving, or otherwise disintergrating minerals and mineral-like substances.

Other objects of the invention are to provide a heating instrumentality which may be safely operated; which is light and easily portable; which is adequately protected against damage by heat; and in which the component parts may be removed and replaced simply and easily.

Still another object is to provide a novel process for thermally piercing, cutting, grooving, or otherwise disintegrating minerals and mineral-like substances.

The above and other objects will become apparent from the following description taken in connection with the accompanying drawings in which:

Fig. 1 is a longitudinal sectional view, partly in elevation, of a blowpipe embodying the principles of the invention, parts being broken away;

Fig. 2 is a front end elevational view of the blow-pipe shown in Fig. 1;

Fig. 3 is a sectional view taken on the line 3—3 of Fig. 1, looking in the direction of the arrows;

Fig. 4 is a sectional view taken on the line 4—4 of Fig. 1, looking in the direction of the arrows;

Fig. 5 is a longitudinal sectional view, partly in elevation, of a front end portion of a modified form of blow-pipe embodying the principles of the invention;

Fig. 6 is an enlarged front end elevational view of the blow-pipe shown in Fig. 5; and Fig. 7 is an enlarged sectional view taken on the line 7—7 of Fig. 5, looking in the direction of the arrows.

In general, the invention contemplates the provision of an improved heating instrumentality which is adapted to produce intense heat at the forward or operating end thereof, and which is adapted to discharge a plurality of laterally flowing streams of a debris-ejection fluid from the peripheral surface adjacent to the forward end thereof and directed at an angle to the longitudinal axis of the instrumentality, preferably toward the rear. Cooling of the instrumentality is accomplished by means of the debris-ejection fluid flowing forward therein and leaving at the front end, although it sometimes may be desirable to employ auxiliary cooling means. When the instrumentality, used for piercing a hole in a mineral or mineral-like material, such as rock, is a blowpipe, a diffusion type of flame, in which the fuel and combustion-supporting gas are intermixed after discharge from the blowpipe, is employed to produce the intense heat which either spalls or melts off material. There is thus no danger of flashbacks occurring within the blowpipe. The gaseous products of combustion, supplemented by the ejection fluid streams, impel the debris produced, in the form of either slag or spallings, rearwardly through the clearance space surrounding the blowpipe toward the mouth of the hole, from which they are discharged. Also, in accordance with the invention, there is provided a novel process of thermally working a solid body of mineral or like material, as by piercing, cutting, grooving, or otherwise disintegrating it. The process comprises discharging, from a blowpipe or other suitable source means within a selected substantially enclosed region of the mineral body, separate adjoining streams of a combustion-supporting gas and a fuel gas in such a way that the gases mix together outside the source means and form a combustible gas mixture within the enclosed region. This gas mixture then is burned within the enclosed region, thereby producing intense heat and disintegrating an adjacent zone of the mineral body, either by spalling or by melting. The source means is advanced within the mineral body to similarly produce such heat adjacent successive zones of the body and progressively disintegrate them along a selected path. Concurrently with the heating and disintegrating steps, the disintegrated portions of the mineral body are removed from adjacent the successively disintegrated zones by the action of a flowing stream of ejection fluid, such as the gaseous products of combustion, or independent streams of air or water.

When the process is used for piercing holes, the flames produced by burning the combustible gas mixture are first directed against the face of the body within a selected area, thereby disintegrating an adjacent zone of the body and forming the initial portion and mouth of the hole. The source means is progressively advanced into the initial portion of the hole and into successive portions of the hole, as they are produced, to progressively heat and disintegrate successive zones and form successively deeper portions of the hole. The stream or streams of ejection fluid, in hole piercing, flow rearwardly from adjacent the successive zones disintegrated, toward the mouth of the hole.

The embodiment of the blowpipe of the invention illustrated in Fig. 1 is a blowpipe comprising an elongated hollow tubular member having a body B at the manipulating end thereof, a tip T at the operating end thereof, and a plurality of nested conduits connecting the body B and the tip T. Means are provided for discharging a fuel and a combustion-supporting gas in separate adjacent streams from the forward end of the tip T, as well as means for discharging a plurality of debris-ejection fluid streams from the external surface of the tip directed toward the rear of the blowpipe. Fuel, combustion-supporting gas, and a debris-ejecttion fluid are admitted to the appropriate conduits through inlet connections associated with the body B and thence are conducted to the appropriate discharge means at the forward end of the blowpipe.

More specifically, as shown in Fig. 1, the blowpipe comprises a body B at the rear or manipulating end thereof having a longitudinal internally-threaded bore 11 in the front end thereof opening at its rear end into an enlarged substantially cylindrical chamber 12, into the rear of which open an inclined passage 13 adjacent to the outer edge thereof, and an internally threaded bore 14 arranged eccentrically relatively to the front bore 11. An inclined passage 15 opens into the bore 14 at the side thereof, and a short bore 16 of small diameter and substantially concentric with the front bore 11 opens into the eccentrically-arranged bore 14 at the rear end thereof. In the rear end of the body B are two internally-threaded longitudinal bores 17 and 18, communicating with the inclined passages 13 and 15 respectively. A counterbore 19 in the rear end of the body B, internally threaded at the rear end thereof at 20, is substantially axially alined with the short bore 16 and communicates therewith.

The tip T at the operating end of the blowpipe comprises a cylindrical block of copper or other heat-resistant material having an axial longitudinal passage 22 internally threaded for a portion of its length at the rear thereof, opening to the atmosphere in the front face of the tip, and opening at its rear end into an enlarged counterbore 23 which in turn opens at its rear end into a counterbore 24 of still greater diameter, providing an annular stop shoulder 25. A deep annular groove or distributing chamber 26 extends forwardly from the front face of the counterbore 23 adjacent to the circumferential edge thereof, thus forming a projecting cylindrical boss 27, and, in conjunction with the counterbores 23 and 24, an annular surrounding flange 28. A plurality of lateral ports 29, extending through the flange 28, open into the groove or distributing chamber 26 and have apertures on the external peripheral surface of the tip T arranged in substantially equally spaced relation to one another in an annular zone about the circumference thereof. It has been found most advantageous that the ports 29 be inclined so as to diverge from the blowpipe longitudinal axis toward the rear of the blowpipe, and with their axes lying in planes extending radially from the blowpipe longitudinal axis.

The tip T communicates with the body B by means of a plurality of elongated nested conduits which are adapted to conduct fluids therethrough. A pipe 30 opens at its front end into the tip passage 22 and is threadedly secured therein, and at its rear end is threadedly secured within the eccentrically arranged bore 14 of the body B, thus binding together the tip T and the body B. Disposed around the pipe 30 in spaced relation to the outside wall thereof is a casing 36 threadedly secured at its rear end within the bore 11 of the body B, and snugly fitting at its front end within, and opening into the rear counterbore 24 in the tip T. Within the pipe 30, in spaced relation to the inside wall thereof is a tube 31 which extends at its front end into the tip passage 22 in spaced relation to the wall thereof and terminates substantially flush with the orifice of the passage 22. This tube 31 snugly fits within the short rear body bore 16 and projects rearwardly therethrough into the counterbore 19, within which it is secured by a press fit to a packing gland or sleeve 32. Suitable packing material 34 is provided around the tube 31 between the bottom of the counterbore 19 and the front face 33 of the gland 32. An inlet nipple 35 is threadedly secured within the counterbore 19 and at its front end bears against the rear face of the packing gland 32 which thus compresses the packing 34 around the tube 31 to form a seal between the bore 14 and the atmosphere. In order to maintain the inlet nipple 35 in position, a lock nut 21 is threadedly secured thereon and may be turned to bear against the rear face of the body B. The body B is also provided with suitable inlet connections, such as the nipples 39 and 40, threadedly secured within the rear bores 17 and 18 respectively.

With the arrangement of the nested conduits, as just described, it is evident that the tube 31 and the casing 36 are substantially concentric with respect to one another and that the pipe 30 is eccentrically arranged with respect to the tube 31 and the casing 36. This eccentric arrangement of the pipe 30 is maintained for the major portion of its length; but it has been found advantageous that the pipe be slightly sloped so that its longitudinal axis gradually approaches the common longitudinal axis of the concentric tube 31 and the casing 36. For a short distance adjacent to the forward end of the blowpipe the pipe 30 is substantially concentric with the tube 31 and the casing 36. With such an arrangement of the nested conduits, the annular passage 37 between the inside wall of the casing 36 and the outside wall of the pipe 30, and the annular space 38 between the inside wall of the pipe 30 and the tube 31, are each decidedly eccentric for the greater portion of their lengths but gradually approach a condition of uniform width about the entire circumferences thereof toward the front of the blowpipe. For a short distance adjacent to the front end of the blowpipe, the passage 37 and the space 38 are for all practical purposes of substantially uniform width about the entire circumferences thereof.

When thermally piercing, cutting, grooving, or otherwise disintegrating minerals and the like, it is sometimes necessary that the blowpipe operator be protected from dust emanating from the zone of operation. For this purpose, an atomizer 41 of any desired construction is threadedly secured within a radial hole 42 opening into the enlarged chamber 12 in the body B. A portion of the debris-ejection fluid, such as air, water, or an air-water mixture, may be discharged through the atomizer 41 to form a curtain between the operator, at the manipulating end of the blowpipe, and the material in the process of disintegration. If air is discharged from the atomizer 41, all dust is blown away from the vicinity of the operator. If water, or an air-water mixture spray is used, the dust may be blown away to some extent but a large part is dampened and drops to the ground. When such a curtain is unnecessary, the atomizer may be capped to prevent the escape of fluid.

In the operation of the blowpipe just described, a combustion-supporting gas, for example oxygen, is admitted to the central tube 31 through the inlet nipple 35 and is discharged longitudinally in a stream from the front end of the blowpipe. A fuel, for example acetylene, or acetylene in which is suspended a comminuted flux, or a powdered fuel such as iron, aluminum, or mixtures of the two, is admitted to the body B through the inlet nipple 40, passes through the inclined passage 15 and enters the annular space 38 through which it passes to the front of the blowpipe and is discharged from the tip T through the passage 22 in an annular stream surrounding and enveloping the longitudinal oxygen stream.

The fuel and the combustion-supporting gas form a combustible mixture externally of the blowpipe by diffusion of one into the other, by the aspirating action of the central oxygen stream and, when the tip is operating within a blast hole or similar cavity, by the turbulence produced therein. On ignition and burning of the combustible gas mixture in advance of the tip T an intensely hot flame is produced, which is of sufficient intensity for disintegrating either heat-spallable or fusible minerals with ease. Because of the fact that the combustible gas mixture is produced externally of the blowpipe, furthermore, there is no danger of explosive flashbacks occurring within the blowpipe when excessive pressure builds up in a blast hole or other cavity. As has been previously mentioned, the annular fuel conducting passage 38 is decidedly eccentric with respect to the tube 31 for the major portion of its length, but is substantially concentric with the latter for a short distance adjacent to and immediately in the rear of the tip T. Such a construction is particularly advantageous when the fuel comprises a gas in which is suspended comminuted solid material, for the possibility of powder settling out and clogging the passage is thus reduced to a minimum, and yet it is possible for the fuel to leave the tip in an evenly distributed annular stream.

Ejection of debris from a hole in the form of either spallings or slag is accomplished by means of a fluid such as air, water, or an air-water mixture, which is admitted to the blowpipe through the inlet nipple 39, passes through the inclined passage 13 into the chamber 12 and is thence conducted through the annular passage 37 to the tip T, where it enters the distributing chamber 26 and is then discharged adjacent to the bottom of the hole through the ports 29 in a plurality of streams directed toward the rear of the blowpipe and the mouth of the hole with their axes lying substantially in planes extending radially from the blowpipe axis. Furthermore, the blowpipe is protected from heat damage by the cooling action of the ejection fluid as it traverses the passage 37. It may be advantageous in some circumstances to provide auxiliary cooling means, such as an additional passage through which a cooling medium such as water may be circulated in heat transfer relation with the blowpipe.

Dismantling of the blowpipe for repair or replacement of essential parts may be accomplished with ease. By removing the inlet nipple 35 from the counterbore 19, access may be had to the packing gland 32 which is engaged with the rear end of the central tube 31, and the tube and gland may then be extracted as a unit from the rear end of the body B. To further dismantle the blowpipe, the tip T may be unthreaded from the front of the pipe 30, after which the casing 36 and the pipe 30 may be removed from the bores 11 and 14 respectively of the body B.

In Fig. 5 is illustrated a front portion of a modified form of blowpipe embodying the principles of the invention. The modification shown in Fig. 5 comprises a tip T' and a plurality of nested conduits communicating between the tip T' and a body (not shown) which may be substantially identical with the body B shown in Fig. 1. The tip T' comprises a substantially cylindrical body of copper or other heat and corrosion resisting material having a longitudinal axial passage 43 internally threaded for a portion of its length at the rear thereof and opening at its front end into a flaring conical-walled orifice 44 in the front of the tip. The passage 43 opens at its rear end into a longitudinal counterbored distributing chamber 45 in the rear end of the tip, substantially coaxial with the axial passage 43, and surrounded by an annular flange 52. The external surface of the tip T' comprises a main substantially cylindrical portion 46, a short cylindrical section 47 in the rear of and of less diameter than the main portion 46, an annular bevel 48 between said portions 46 and 47, and a third short cylindrical section or annular lip 49 in the rear of and of less diameter than the section 47 and forming a shoulder 50 with the latter. A plurality of lateral ports 51 which extend through the flange 52, open into the distributing chamber 45 adjacent to the front end thereof and have apertures arranged on the bevel 48 substantially equally spaced from one another in an annular zone about the whole circumference thereof. Here also the ports 51 are most advantageously inclined toward the rear of the blowpipe and have their respective axes inclined at an angle to, and lying in planes extending radially from the longitudinal axis of the blowpipe. The tip T' communicates with the body (not shown) by means of a plurality of elongated nested fluid conduits. A pipe 54, which opens at its front end into the passage 43, is threadedly secured within said passage. Communicating with the distributing chamber 45 is a casing 65, disposed around the pipe 54 in spaced relation to the outside wall thereof, which fits over and bears snugly against the annular lip 49 and the shoulder 50, to which it may be secured as by silver soldering. Disposed within the pipe 54 in spaced relation to the inside wall thereof is a central tube 55 which terminates at the front end of the passage 43. A nozzle 56 carried by the tip T' within the conical orifice 44 is secured upon the forward end of tube 55 and has a forwardly-diverging conical external wall 57 substantially parallel to the conical wall of the orifice 44 and spaced therefrom to provide a passage 64 therebetween. The nozzle 56 is generally frusto-conical in shape and is provided with a flat front face 58 substantially normal to the nozzle axis, and an annular bevel 59 extending rearwardly from the flat face 58 to the intersection thereof with the conical wall 57. A socket 60 in the rear end of the nozzle 56 receives the front end of the tube 55 and acts as a distributing chamber into which opens a group of ducts 61 diverging slightly forwardly from the common longitudinal axis of the nozzle and the blowpipe to their orifices in the forward nozzle face 58. A second group of ducts 62 diverge forwardly from the common blowpipe and nozzle axis at a greater angle than do the ducts 61 and have a group of orifices in the nozzle bevel 59 substantially equally spaced from one another in an annular zone extending about the whole circumference of said bevel. In order to accurately space the nozzle 56 within the orifice 44 to maintain constant the width of the passage 64, a plurality of radially outstanding fins 63 on the nozzle 56 are arranged in contact with the wall of the orifice 44.

Each of the nested conduits 54, 55, and 65 is secured to the body (not shown) in the same way as are the nested conduits of the blowpipe of Fig. 1, and it is apparent, therefore, that the same provision is made for the formation of an eccentric annular passage between the tube 55 and the pipe 54. Also, the removal of essential parts for replacement or repair is accomplished in much the same manner, the only difference being that in the blowpipe of Fig. 5, removal of the central tube 55 is accomplished from the forward or tip end of the blowpipe by pulling the tube forwardly and thus breaking the press fit of the rear end of the tube with the packing gland (not shown).

In the operation of the form of the invention shown in Fig. 5 a combustion-supporting gas is conducted through the central tube 55 to the socket or distributing chamber 60 from which the gas passes through the two groups of diverging nozzle ducts 61 and 62 and is discharged to the atmosphere at the front of the tip in two coaxial rings of gas streams diverging forwardly from the blowpipe axis and from each other. Fuel, such as acetylene, or acetylene in which is suspended a comminuted solid flux or a comminuted solid fuel, is conducted through the pipe 54 to the tip T' where it enters the passage 43 and is then discharged from the tip through the passage 64 in an outwardly flaring substantially annular sheet enveloping the combustion-supporting gas streams. A combustible gas mixture is thus produced externally of the blowpipe in front of the tip, and on ignition, because of the mixture of a plurality of individual high pressure combustion-supporting gas streams with the substantially annular stream of fuel, a plurality of small intensely hot flames are produced which flare outwardly from the tip and are spread conewise over a considerable area. The advantage of such flame distribution is that a hole of large diameter may be pierced because the flames tend either to melt or spall off material over a considerable area rather than only immediately adjacent to the tip. Thus, the clearance space surrounding the blowpipe, through which debris may be ejected, is made sufficiently wide to prevent clogging of the hole and consequent stoppage of the operation. Debris ejection and cooling of the blowpipe are accomplished by conducting a fluid under pressure through the casing 65 to the distributing chamber 45 from which the fluid is discharged through the rearwardly-inclined lateral ports 51 in a plurality of rearwardly-directed streams substantially equally spaced from one another in a ring about the periphery of the tip and having their axes in planes extending radially from the longitudinal blowpipe axis. These streams act to eject debris from a blasthole concurrently with the heating operation so that the piercing operation may proceed without hindrance and at the greatest possible speed.

Although the principles of the invention have been described in the foregoing paragraphs as incorporated in heating instrumentalities utilizing a combustible mixture of fuel and combustion-supporting gas as the source of heat, it is evident that these principles may be applied to other types of heating instrumentalities. For example, heating may be accomplished electrically, as by the use of the electric arc, in which case arcs may be struck between pairs of electrodes arranged at a desirable angle and fixed at the forward or operating end of an instrumentality such as has been previously described. Debris ejection, of course, in such an instrumentality may be accomplished in the same manner as in the blowpipes previously described by discharging rearwardly directed fluid streams from the forward end thereof. Powdered flux or fuel likewise may be fed to the electrically-heated zone in suspension in a gas.

Although the principles of the invention have been described as embodied in a process of and heating instrumentalities for the piercing of blast holes in minerals and the like, it is to be understood that these principles may also be utilized for diverse other operations to be performed on minerals or the like, or on oxidizable or non-oxidizable metallic substances, and the scope of the invention is therefore to be limited only by the claims appended hereto.

We claim:

1. In a heating instrumentality for thermally piercing, cutting, grooving, or otherwise disintegrating minerals and the like, means provided with a plurality of passages, including adjacent passages for discharging from the forward end of the instrumentality separate streams of a combustion-supporting gas and of a fuel combustible in such gas, and a passage for discharging an ejection fluid in a rearward direction, relative to the forward end of the instrumentality; said means and said adjacent passages being so constructed and arranged that streams of combustion-supporting gas and of fuel discharged therefrom are caused to mix externally of the heating instrumentality to minimize substantially the occurrence of flashbacks, and to form a mixture adapted to produce upon ignition intense flames of the diffusion type.

2. In a heating instrumentality as defined in claim 1, means for bringing a cooling medium into heat transfer relationship with said instrumentality to prevent damage to said instrumentality by heat.

3. In a heating instrumentality adapted to provide heat for thermally piercing holes in minerals and the like: means for discharging a debris-ejection fluid stream therefrom adjacent to the bottom of a hole, said fluid-discharge means being so constructed and arranged that the direction of flow of fluid discharged therefrom is toward the mouth of such hole and generally along a line lying substantially in a plane which extends radially from the longitudinal axis of said instrumentality.

4. In a heating instrumentality for thermally piercing, cutting, grooving, or otherwise disintegrating minerals and the like, means for discharging a combustion-supporting gas from the forward end thereof; means for discharging a fuel in an envelope around said combustion-supporting gas, said combustion-supporting gas discharge means and said fuel-discharge means being so constructed and arranged that combustion-supporting gas and fuel discharged from said instrumentality are caused to mix externally of the heating instrumentality; means for conducting an ejection fluid to a point adjacent to the forward end of said instrumentality; and said instrumentality having adjacent to the forward end thereof a plurality of ports communicating with said fluid-conducting means, said ports being adapted to direct ejection fluid toward the rear of said instrumentality.

5. A heating instrumentality comprising a tip adapted to discharge separate streams of a fuel and of a combustion-supporting gas therefrom, said tip also being adapted to discharge a debris-ejection fluid in a rearward direction therefrom; a plurality of supply conduits communicating with said tip, at least two of said conduits being adapted to supply a fuel and a combustion-supporting gas respectively to said tip, and at least one of said conduits being adapted to supply a debris-ejection fluid to said tip; and inlet means for fuel, combustion-supporting gas, and ejection fluid, respectively communicating with the corresponding conduits.

6. A heating instrumentality comprising a tip adapted to discharge separate streams of a fuel and of a combustion-supporting gas therefrom; inlet connections for the respective streams; a plurality of conduits communicating between said tip and said inlet connections; at least two of said conduits being adapted to supply a fuel and a combustion-supporting gas respectively to said tip, and at least one of said conduits being adapted to supply a debris-ejection fluid to said tip; and said instrumentality having adjacent to the front end thereof a plurality of ports diverging rearwardly from the longitudinal axis thereof, communicating with said ejection-fluid supply conduit, and having apertures arranged on the external surface of said instrumentality.

7. A heating instrumentality for thermally piercing holes in minerals and the like comprising a tip adapted to discharge separate streams of a fuel and of a combustion-supporting gas therefrom, said tip also being adapted to discharge a debris-ejection fluid in a rearward direction therefrom; a plurality of supply conduits extending rearwardly from said tip, at least two of said conduits being adapted to supply a fuel and a combustion-supporting gas respectively to said tip, and at least one of said conduits being adapted to supply a debris-ejection fluid to said tip; inlet means for fuel, a combustion-supporting gas, and an ejection-fluid, communicating respectively with the corresponding supply conduits; and means adjacent to the rear end of said instrumentality for discharging laterally therefrom a curtain of fluid whereby the access of debris to the operator may be prevented.

8. A heating instrumentality comprising a tip having a longitudinal passage provided with an orifice at the front thereof; a body having inlet connections respectively for a gas-powder mixture and for a combustion-supporting gas; a tube secured at its rear end to said body, communicating with said combustion-supporting gas inlet, and extending into said tip passage in spaced relation to the walls thereof; and a pipe disposed about said tube in eccentric spaced relation thereto for the major portion of its length, communicating with said tip passage and communicating at its rear end with said gas-powder inlet, said pipe being substantially concentric with said tube for a portion of its length adjacent to the front end of said instrumentality; said pipe and said tube forming a passage therebetween of such a shape that a minimum obstruction is offered to the flow of said gas-powder mixture, thereby preventing clogging of said last-named passage.

9. A heating instrumentality adapted to discharge separate streams of fuel and combustion-supporting gas therefrom, said instrumentality comprising a tip provided with a longitudinal passage having an orifice at the front thereof, said tip having an ejection-fluid-distributing chamber therein and having a plurality of rearwardly directed ports communicating with said chamber and having apertures on the external surface of said tip; a body having inlet connections respectively for a fluid fuel, a combustion-supporting gas, and a debris-ejection fluid; a tube secured at its rear end to said body in communication with said combustion-supporting gas inlet, and extending at its forward end into said longitudinal passage in spaced relation to the wall thereof; a pipe disposed about said tube and spaced therefrom, said pipe being secured at its rear end to said body in communication with said fuel inlet, and at its front end being secured to said tip in communication with the space between said tube and the wall of said longitudinal passage; and a casing disposed about said pipe and spaced therefrom, said casing being secured at its rear end to said body in communication with said ejection-fluid inlet and communicating at its front end with said distributing chamber in said tip, said tube and the space between said tube and the wall of said longitudinal passage being adapted to discharge separate streams of combustion-supporting gas and fuel for mixing externally of said tip.

10. An elongated heating instrumentality comprising, a tubular member; means for discharging a plurality of combustion-supporting gas streams in a group from the forward end of said member in forwardly divergent relation to the longitudinal axis of said instrumentality; separate means for discharging fuel around said group of combustion-supporting gas streams; and means for discharging a plurality of debris-ejection fluid streams from said member adjacent to the forward end thereof.

11. A heating instrumentality comprising a tip having a longitudinally-extending passage therein, which passage opens at its front end into a flaring orifice and at its rear end into a distributing chamber, said tip having a plurality of ports communicating with said chamber and having apertures on the external surface of said tip, said ports being adapted to discharge an ejection fluid toward the rear of said instrumentality; an elongated casing communicating with said chamber; a pipe disposed within said casing in spaced relation to the inside wall thereof and communicating with said passage; a tube disposed within said pipe in spaced relation to the internal wall thereof and arranged with its forward end within said tip passage in spaced relation to the wall thereof; and a nozzle in said orifice secured to the forward end of said tube, said nozzle being spaced from the wall of said orifice, and said nozzle having a plurality of ducts communicating with the interior of said tube and opening to the atmosphere at the forward end of said tip.

12. A heating instrumentality comprising a tip having a longitudinally-extending passage, which passage opens at the front end thereof into a flaring orifice and at the rear end thereof into a distributing chamber, said tip having a plurality of ports communicating with said chamber and having apertures on the external surface of said tip, said ports being arranged to discharge fluid rearwardly relative to the front of said instrumentality; a body having a plurality of inlet connections; a casing secured to said body, communicating with one of said inlet connections, and communicating with said distributing chamber; a pipe within said casing, secured at its rear end to said body in communication with a second inlet connection, said pipe communicating with said tip passage; a tube within said pipe, secured at its rear end to said body in communication with a third inlet connection, and extending at its forward end into said tip passage in spaced relation to the wall thereof; and a nozzle secured to the forward end of said tube, said nozzle being spaced from the wall of said orifice, and said nozzle having a plurality of ducts establishing communication between the interior of said tube and the atmosphere at the front of said tip and diverging forwardly from the axis of said instrumentality and from each other.

13. A blow pipe for thermally piercing minerals and like substances for the production of elongated passages therein, which comprises an elongated tubular member; means for discharging from said member a stream of a combustion-supporting gas upon the substance being pierced; means for discharging a suspension of a finely-divided oxidizable metal in a combustible gas from said member in a flowing envelope substantially surrounding said stream of combustion-supporting gas; said tubular member having ejection-fluid passages adjacent to said respective discharge means, which passages are adapted to discharge an ejection fluid in a direction generally toward the rear of said blowpipe; and means for directing an ejection fluid under high pressure to said passages.

14. A blowpipe for thermally piercing minerals and like substances for the production of elongated passages therein, which comprises an elongated tubular member; means in the latter for discharging a combustion-supporting gas in divergent streams toward the substance to be pierced; means in said tubular member for discharging a suspension of a finely-divided oxidizable metal in a combustible gas as a flowing envelope substantially surrounding said combustion-supporting gas streams, said last-named means comprising a tube having a passage therethrough, and said first-named means comprising a second tube extending within said passage, each of said tubes having an inlet and an outlet, the second tube at its inlet end being eccentrically arranged with respect to said passage; means providing passages disposed in said tubular member adjacent to said respective discharge means and adapted to discharge an ejection fluid in a direction which is generally toward the rear of the blowpipe; and means for directing an ejection fluid under high pressure to said last-named passages.

15. A blowpipe for thermally piercing minerals and like substances for the production of elongated passages therein, which comprises an elongated hollow tubular member having a tip of heat-resistant material at one end; a conduit extending longitudinally within said member and spaced from the walls of the latter to define a first passage; a second conduit extending within said first-named conduit in spaced relation thereto, having the end thereof remote from said tip disposed eccentric with respect to the first-named conduit, and having the end thereof adjacent to the tip arranged substantially concentric with respect to said first-named conduit; means for introducing into the space defined between the walls of the respective conduits a suspension of a finely-divided metal in a fluid fuel; means for conducting to said second-named conduit a combustion-supporting gas; said tubular member being provided with passages in said tip in communication with said first passage for discharging an ejection fluid in a direction which is generally rearwardly of said tip; and means for directing an ejection fluid under high pressure to said first passage.

16. A process for thermally piercing minerals and like substances, which comprises, directing a stream of a combustion-supporting gas within a selected region upon the substance being pierced, concurrently directing into said region and substantially surrounding said stream a flowing body of a combustible fluid, firing the latter in said region thereby producing intense heat and disintegrating an adjacent zone of said substance, advancing the burning combustible fluid to progressively disintegrate successive zones of said substance, and promptly and continuously removing disintegrated material from adjacent said zones under the action of a high velocity flowing stream of an ejection fluid.

17. Process as defined in claim 16, wherein the combustion-supporting gas is directed into said region in a plurality of streams diverging from one another.

18. Process as defined in claim 16, wherein the respective combustion-supporting gas and the said combustible fluid are introduced into the said region in non-parallel streams and mix therein to form a combustible gas mixture.

19. A process for thermally piercing minerals and like substances, which comprises directing at least one stream of a combustion-supporting gas upon the substance being pierced within a selected region, concurrently directing into said region and substantially surrounding said stream or streams a flowing body of at least one finely-divided combustible metal in suspension in a combustible fluid, burning the said metal and combustible fluid in said region thereby producing intense heat and disintegrating an adjacent zone of said substance, advancing the burning metal and combustible fluid to progressively disintegrate successive zones of said substance, and promptly and continuously removing the disintegrated material from adjacent said zones under the action of a flowing stream of an ejection fluid.

20. Process as defined in claim 19, wherein the respective combustion-supporting gas and the said suspension of metal in a combustible fluid are directed into the said region in non-parallel streams and mix therein to form a combustible gas mixture.

21. Process as defined in claim 19, wherein the combustion-supporting gas and the said suspension of metal in a combustible fluid are directed into said region in a plurality of streams diverging respectively from one another, and mix therein to form a combustible gas mixture.

22. A heating instrumentality adapted to provide heat for thermally piercing, cutting, or otherwise disintegrating minerals and the like, comprising a heating end; a manipulating end; and means for discharging in a lateral direction intermediate said ends a curtain of fluid whereby the access of debris to an operator is prevented.

23. A heating instrumentality as defined in claim 22, also including means for discharging a debris-ejection fluid therefrom.

24. In a heating instrumentality, a tip having a flaring orifice in the forward end thereof and a chamber in back of said orifice; means providing ports communicating with said chamber and having apertures on the external surface of said tip, said ports being adapted to discharge debris-ejection fluid rearwardly therefrom; a nozzle in said orifice in spaced relation to the wall thereof, said nozzle having a first group of ducts therein having orifices arranged in an annular zone on the forward end thereof, the ducts of said first group diverging forwardly from the longitudinal axis of said instrumentality, said nozzle also having a second group of ducts therein having orifices arranged on the forward end thereof in an annular zone surrounding said first-mentioned annular zone, the ducts of said second group diverging forwardly from said longitudinal axis at a greater angle than the ducts of said first group; means for supplying a gas to said nozzle; means for supplying a second gas to said orifice, one of such gases comprising a combustion-supporting gas and the other comprising a fuel gas; and means for supplying a debris-ejection fluid to said chamber.

25. In a heating instrumentality for thermally piercing, cutting, grooving, or otherwise disintegrating minerals and the like, means provided with a plurality of passages, including adjacent passages for discharging separate streams of a combustion-supporting gas, and of a fuel combustible in such gas, and a passage for discharging an ejection fluid; said means and said adjacent passages being so constructed and arranged that streams of combustion-supporting gas and of fuel discharged therefrom are caused to mix externally of the heating instrumentality to minimize substantially the occurrence of flashbacks, and to form a mixture adapted to produce upon ignition intense flames of the diffusion type.

26. A process of thermally working a solid body of mineral or like material, which process comprises discharging, from suitable source means within a selected substantially enclosed region of said body, separate adjoining streams of a combustion-supporting gas and a fuel gas, to mix such gases together outside said source means and form a combustible gas mixture within said region; burning said gas mixture within said region, thereby producing intense heat and disintegrating an adjacent zone of said body; advancing said source means within said body, to similarly produce heat adjacent successive zones of said body and progressively disintegrate them; and concurrently removing disintegrated portions of said body from adjacent such zones by a flowing stream of ejection fluid.

27. A process as claimed in claim 26 wherein said fuel gas carries in suspension therein a finely-divided combustible metal, said metal also burning within said region and supplementing the heat produced by the burning of such combustible gas mixture.

28. A process for thermally piercing a hole in a solid body of mineral or like material, which process comprises discharging from suitable source means, and adjacent a selected area of a face of said body, separate adjoining streams of a combustion-supporting gas and a fuel gas, to mix such gases together outside said source means and form a combustible gas mixture; burning said gas mixture and directing the resulting flame against the face of said body within said area, thereby producing intense heat and disintegrating an adjacent zone of such body to produce the initial portion and mouth of such hole; progressively advancing said source means into said initial portion of such hole and into successive portions of such hole, as formed, to similarly produce heat adjacent successive zones of said body and progressively disintegrate them, forming successively deeper portions of said hole; and concurrently removing disintegrated material from said portions of such hole by a stream of ejection fluid flowing rearwardly from adjacent said zones toward the mouth of such hole.

29. A process of thermally working a solid body of a heat-spallable mineral or like material, which process comprises discharging, from suitable source means within a selected substantially enclosed region of said body, separate adjoining streams of a combustion-supporting gas and a fuel gas, to mix such gases together outside said source means and form a combustible gas mixture within said region; burning said mixture within said region and producing a flame of sufficient intensity to heat such material to its spalling temperature, thereby heating and disintegrating an adjacent zone of said body by spalling off particles of material in a finely-divided unfused condition; advancing said source means within said body to similarly heat successive zones of said body and progressively disintegrate them by spalling; and concurrently removing the spalled particles in the finely-divided unfused condition from adjacent such zones by a flowing stream of ejection fluid; said spalled particles being removed sufficiently promptly and rapidly that the portions of material successively exposed to the flame are prevented from reaching their melting temperature.

ROBERT B. AITCHISON.
GEORGE H. SMITH.
CHARLES W. SWARTOUT.